US009470031B2

(12) United States Patent
Nishikibe et al.

(10) Patent No.: US 9,470,031 B2
(45) Date of Patent: Oct. 18, 2016

(54) OPENING/CLOSING BODY CONTROL DEVICE FOR VEHICLE

(71) Applicant: AISIN SEIKI KABUSHIKI KAISHA, Kariya-shi (JP)

(72) Inventors: Takeshi Nishikibe, Tokai (JP); Toshihiko Ishida, Niwa-gun (JP); Tsuyoshi Kamiya, Anjo (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 187 days.

(21) Appl. No.: 14/377,837

(22) PCT Filed: Feb. 18, 2013

(86) PCT No.: PCT/JP2013/053878
§ 371 (c)(1),
(2) Date: Aug. 8, 2014

(87) PCT Pub. No.: WO2013/125490
PCT Pub. Date: Aug. 29, 2013

(65) Prior Publication Data

US 2016/0123061 A1 May 5, 2016

(30) Foreign Application Priority Data

Feb. 21, 2012 (JP) ................................ 2012-035243

(51) Int. Cl.
*E05F 15/632* (2015.01)
*E05F 15/646* (2015.01)
(Continued)

(52) U.S. Cl.
CPC .................. *E05F 1/002* (2013.01); *B60J 5/06* (2013.01); *E05B 1/00* (2013.01); *E05F 15/632* (2015.01);
(Continued)

(58) Field of Classification Search
CPC ..... E05F 1/002; E05F 15/646; E05F 15/632; E05B 81/20; E05B 83/40; B60J 5/06
USPC ................. 701/49; 292/201, 336.3; 296/155; 49/360
See application file for complete search history.

(56) References Cited

U.S. PATENT DOCUMENTS 5,551,190 A * 9/1996 Yamagishi ............ E05F 15/646 49/280
5,829,198 A * 11/1998 Watanabe ............... E05B 81/20 49/141

(Continued)

FOREIGN PATENT DOCUMENTS

CN 1496898 A 5/2004
CN 1713239 A 12/2005

(Continued)

OTHER PUBLICATIONS

International Search Report (PCT/ISA/210) mailed on , by the Patent Office as the International Searching Authority for International Application No. PCT/JP2013/053878.

(Continued)

*Primary Examiner* — Yuri Kan
(74) *Attorney, Agent, or Firm* — Buchanan Ingersoll & Rooney PC

(57) ABSTRACT

An opening/closing body control device for a vehicle includes: a drive section for driving an opening/closing body; a controller for controlling the drive section; a handle unit that is operable by an manipulation input in an opening direction and is operable by an manipulation input in a closing direction; a manipulation input detector for detecting the manipulation input for the handle unit and the direction of the manipulation input; and an operation position detector for detecting the operation position of the opening/closing body. When the opening/closing body is in a fully open position, the controller executes closing operation control in order to bring the opening/closing body into closing operation in both a case where the manipulation input in the closing direction is detected and a case where the manipulation input in the opening direction is detected.

16 Claims, 4 Drawing Sheets

(51) Int. Cl.

| | |
|---|---|
| ***B60J 5/06*** | (2006.01) |
| ***E05F 1/00*** | (2006.01) |
| ***E05F 15/70*** | (2015.01) |
| ***E05B 1/00*** | (2006.01) |

(52) U.S. Cl.

CPC ............ *E05F 15/70* (2015.01); *E05Y 2400/30* (2013.01); *E05Y 2400/86* (2013.01); *E05Y 2900/531* (2013.01)

(56) References Cited

U.S. PATENT DOCUMENTS

| | | | | |
|---|---|---|---|---|
| 6,340,199 | B1 * | 1/2002 | Fukumoto | B60J 5/06 296/155 |
| 6,386,620 | B1 * | 5/2002 | Fukumoto | B60J 5/06 296/152 |
| 8,960,738 | B2 * | 2/2015 | Ishida | E05B 83/40 292/336.3 |
| 2002/0089194 | A1 | 7/2002 | Nomura et al. | |
| 2003/0067175 | A1 * | 4/2003 | Shiota | E05B 81/20 292/201 |
| 2004/0125545 | A1 | 7/2004 | Kobayashi | |
| 2005/0285717 | A1 | 12/2005 | Ieda et al. | |
| 2007/0130837 | A1 | 6/2007 | Kusunoki | |
| 2007/0290796 | A1 | 12/2007 | Teshima et al. | |
| 2009/0107050 | A1 | 4/2009 | Suzuki | |

FOREIGN PATENT DOCUMENTS

| | | | |
|---|---|---|---|
| CN | 2828268 | Y | 10/2006 |
| CN | 101092863 | A | 12/2007 |
| JP | 2002-227462 | A | 8/2002 |
| JP | 2003-253961 | A | 9/2003 |
| JP | 4161898 | B2 | 7/2005 |
| JP | 2007-040005 | A | 2/2007 |
| JP | 2007-085032 | A | 4/2007 |
| JP | 2009-079353 | A | 4/2009 |
| JP | 2009-108605 | A | 5/2009 |
| JP | 2010-272276 | A | 12/2010 |
| JP | 2012-067491 | A | 4/2012 |

OTHER PUBLICATIONS

Technical description of a new car model of MPV from Mazda issued on Jan. 2008 (with partial English translation), 2 pages.

U.S. Appl. No. 14/241,741, filed Feb. 27, 2014, Nishikibe et al.

English language translation of International Preliminary Report on Patentability (Form PCT/IB/373) and the Written Opinion of the International Searching Authority (Form PCT/ISA/237) issued on Aug. 26, 2014, by the International Bureau of WIPO in corresponding International Application No. PCT/JP2013/053878. (5 pages).

Office Action issued on Jun. 30, 2015, by the Chinese Patent Office in corresponding Chinese Patent Application no. 201380009755.1, and an English Translation of the Office Action. (12 pages).

* cited by examiner

OPENING/CLOSING BODY CONTROL DEVICE FOR VEHICLE

TECHNICAL FIELD

The present invention relates to an opening/closing body control device for a vehicle.

BACKGROUND ART

Opening/closing bodies for vehicles typically include a handle unit for opening or closing the opening/closing bodies. As disclosed in Patent Document 1, for example, a door handle of a sliding door generally includes a movable part, which is a handgrip, and is capable of releasing restraint (fully closed lock) of the sliding door by a lock mechanism by pulling the handgrip through manipulation of the door handle in the opening direction.

In such a conventional structure, however, even when the sliding door is at a fully open position, the door handle first needs to be manipulated in the opening direction to release the restraint (fully open lock) of the sliding door by the lock mechanism. The sliding door thus cannot be closed through a motion continuous with the unlocking motion. This is one reason for a reduction in convenience for users.

To address this problem, for example, in the handle unit disclosed in Patent Document 2, even if the handle unit is manipulated in a closing direction, the handgrip is allowed to move in that direction in addition to the case where the handle unit is manipulated in the opening direction. The handle unit is thus operable by manipulation inputs in two directions corresponding to an opening operation and a closing operation of the sliding door. That is, the fully open lock is released by a manipulation input in the closing direction to the handle unit. Thus, even when the sliding door is at the fully open position, the sliding door is closed through motion continuous with the unlocking motion as when the sliding door is opened from a fully closed position. Allowing the sliding door to be opened and closed through an intuitive manipulation input by a user to the handle unit as described above improves operability and convenience.

Conventionally, opening/closing body control devices for vehicles have also been proposed that allow an opening/closing body of a vehicle to be opened and closed by a drive source like a door opening/closing apparatus disclosed in, for example, Patent Document 3. Employing such an opening/closing body control device for a vehicle significantly reduces the burden on users.

PRIOR ART DOCUMENTS

Patent Document

Patent Document 1: Japanese Laid-Open Patent Publication No. 2002-227462
Patent Document 2: Japanese Laid-Open Patent Publication No. 2007-85032
Patent Document 3: Japanese Patent No. 4161898

SUMMARY OF THE INVENTION

Problems that the Invention is to Solve

However, when controlling operation of the opening/closing body with the drive source, responding to the user's intuitive manipulation input to the handle unit is not the only factor that improves the operability and convenience. In particular, in the case with the above described handle unit, which is operable by manipulation inputs in two directions, there may be a history effect such as a case where the user has a memory or a habit from manipulating a conventional handle unit. The user therefore does not necessarily manipulate the handle unit in the assumed intuitive direction, and in this respect, there is still room for improvement.

Accordingly, it is an objective of the present invention to improve operability and convenience in an opening/closing body control device for a vehicle that includes a handle unit operable by manipulation inputs in two directions.

Means for Solving the Problems

To achieve the foregoing objective, the present invention provides an opening/closing body control device for a vehicle that includes a drive section, a controller, a handle unit, a manipulation input detector, and an operation position detector. The drive section drives an opening/closing body of the vehicle. The controller controls the drive section. The handle unit is operable by a manipulation input in an opening direction corresponding to an opening operation of the opening/closing body and operable by a manipulation input in a closing direction corresponding to a closing operation of the opening/closing body. The manipulation input detector detects a manipulation input to the handle unit and the direction of the manipulation input. The operation position detector detects the operation position of the opening/closing body. The controller is configured such that, when the opening/closing body is at a fully open position, the controller executes a closing operation control to close the opening/closing body in both a case where a manipulation input in the closing direction is detected and a case where a manipulation input in the opening direction is detected.

According to the above configuration, the opening/closing body located at the fully open position is closed by intuitively manipulating the handle unit in a direction that matches the direction in which the opening/closing body should be operated. Furthermore, even if the user manipulates the handle unit in the opening direction that is opposite to the direction in which the opening/closing body should be operated due to a memory of the past or a habit, the opening/closing body is closed by the manipulation input in the opening direction. It is therefore possible to save the trouble of having to manipulate the handle unit in the closing direction after releasing the fully open lock of the opening/closing body. As a result, the operability and convenience are improved.

MODES FOR CARRYING OUT THE INVENTION

First Embodiment

A first embodiment of the present invention will now be described with reference to the drawings.

Figure 1:
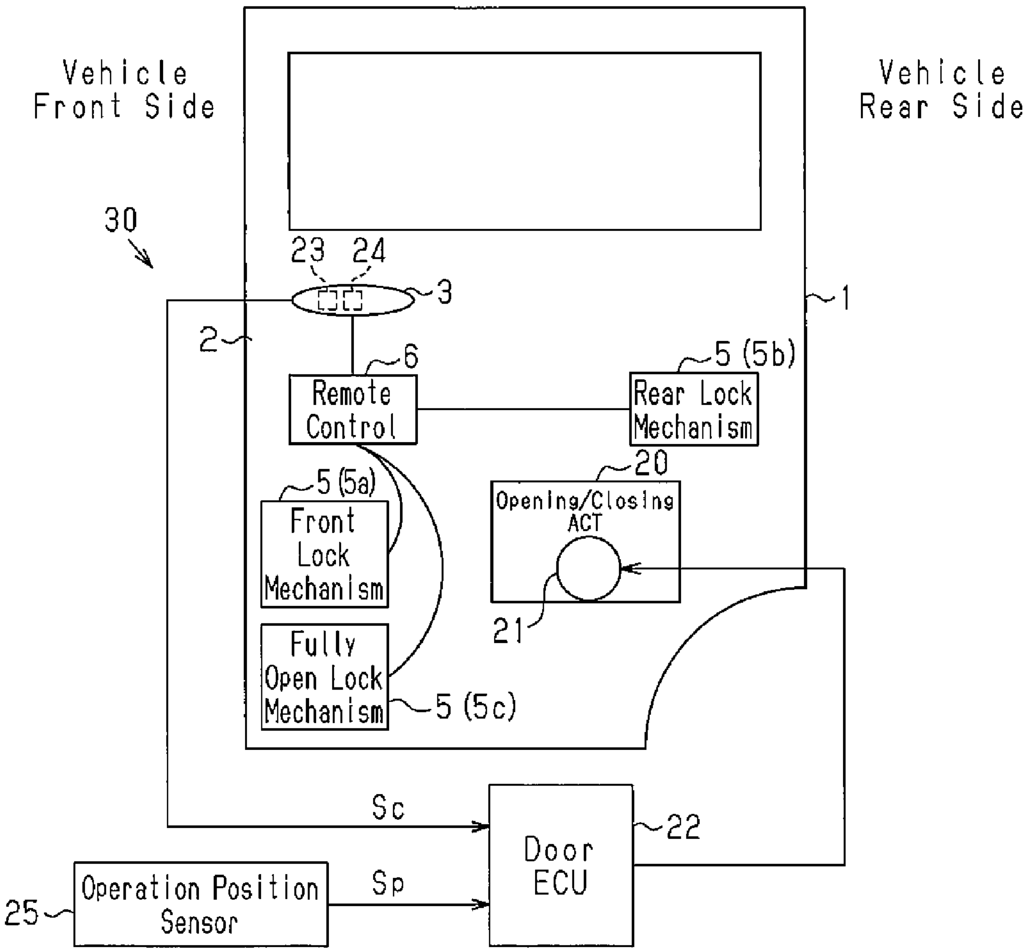
FIG. 1 is a schematic diagram illustrating a door control device according to the present invention.

As shown in FIG. 1, an opening/closing body, which is a sliding door 1 in this embodiment, is movable in a vehicle fore-and-aft direction to be able to open/close an opening portion (not shown) formed in a side surface of a vehicle body. More specifically, the sliding door 1 moves toward a vehicle front side (left side in FIG. 1) to be held in a closed state where the sliding door 1 closes the opening portion of the body, and moves toward a vehicle rear side (right side in FIG. 1) to be held in an open state where passengers are allowed to get in and out through the opening portion. An outer panel 2, which forms the outer surface (ornamental surface) of the sliding door 1, is provided with a handle unit, which is a door handle 3 in this embodiment. The door handle 3 is manipulated to open and close the sliding door 1.

The sliding door 1 is provided with a front lock mechanism 5*a*, which restrains the sliding door 1 at a fully closed position, and a rear lock mechanism 5*b*. The front lock mechanism 5*a* and the rear lock mechanism 5*b* form a fully closed lock mechanism. Furthermore, the sliding door 1 is provided with a fully open lock mechanism 5*c*, which restrain the sliding door 1 at the fully open position. The lock mechanisms (in other words, latch mechanisms) 5 are mechanically connected to the door handle 3 via a transmission member such as a wire that extends from a remote control 6.

That is, in the present embodiment, manipulation force based on manipulation input to the door handle 3 is mechanically transmitted from the door handle 3 to the lock mechanisms 5. The transmitted manipulation force releases the restraint of the sliding door 1 by the lock mechanisms 5, thereby permitting the sliding door 1 at the fully closed position to move in an opening direction, or the sliding door 1 at the fully open position to move in a closing direction.

Figure 2:
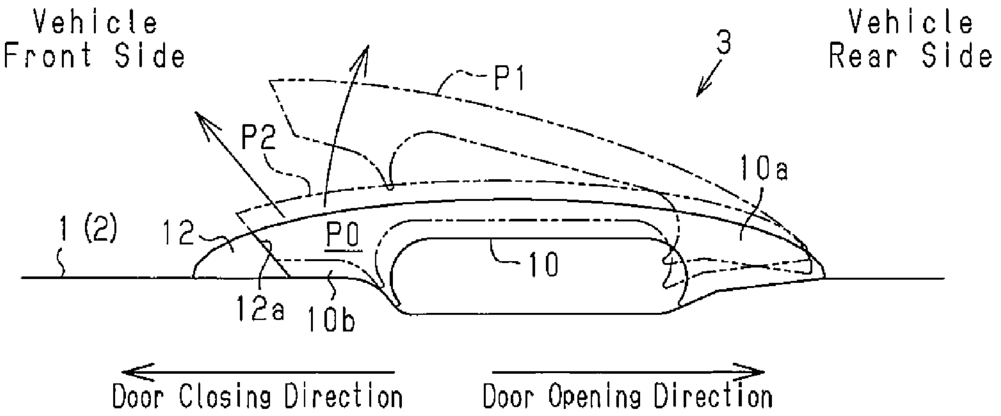
FIG. 2 is a schematic diagram illustrating a door handle operable by manipulation inputs in two directions.

As shown in FIG. 2, the door handle 3 includes a handgrip 10, which moves in two directions including directions toward the vehicle rear side (right side in FIG. 2) and the vehicle front side (left side in FIG. 2) in accordance with manipulation input to the door handle 3.

When manipulated toward the vehicle rear side, the handgrip 10 is moved such that a distal end 10*b* is pivoted toward the vehicle rear side with a rear end 10*a* serving as a fulcrum, and is thus placed at a first motion position P1. Furthermore, when manipulated toward the vehicle front side, the handgrip 10 is moved toward the vehicle front side such that the distal end 10*b* slides along an inclined surface 12*a* of a handle cap 12, which abuts against the distal end 10*b*, and is thus placed at a second motion position P2. The door handle 3 is configured such that, when the manipulation input to the door handle 3 is stopped, that is, when a user lets go of the handgrip 10, the handgrip 10 returns to a neutral position P0 shown with the solid line by a non-illustrated urging member. In this manner, the door handle 3 of the present embodiment is operable by manipulation inputs in two directions corresponding to an opening operation and a closing operation of the sliding door 1, that is, the closing direction corresponding to the closing operation and the opening direction corresponding to the opening operation in accordance with the movement of the handgrip 10.

According to the sliding door 1 of the present embodiment, manipulation force based on the manipulation input is transmitted to the lock mechanisms 5 in both a case where the manipulation input to the door handle 3 is in the closing direction and a case where the manipulation input to the door handle 3 is in the opening direction. Thus, the restraint of the sliding door 1 by the lock mechanisms 5 is released by intuitively manipulating the door handle 3 in the direction that matches the direction in which the sliding door 1 should be operated, not only when the sliding door 1 is opened from the fully closed position, but also when the sliding door 1 is closed from the fully open position.

Furthermore, as shown in FIG. 1, the sliding door 1 includes a drive section, which is capable of opening and closing the sliding door 1. The drive section is a door opening/closing actuator (opening/closing ACT) 20 in this embodiment. The door opening/closing actuator 20 is configured to open and close the sliding door 1, which is an object driven by the door opening/closing actuator 20, when a controller, which is a door ECU 22 in this embodiment, supplies driving electricity to a motor 21, which is a drive source of the door opening/closing actuator 20.

The door handle 3 is provided with an opening manipulation switch 23, which operates in response to the motion of the handgrip 10 toward the vehicle rear side, and a closing manipulation switch 24, which operates in response to the motion of the handgrip 10 toward the vehicle front side. The door ECU 22 detects a manipulation input (presence or absence of a manipulation input) to the door handle 3 and the direction of the manipulation input (manipulation direction) based on a signal (manipulation input signal Sc) output from the opening manipulation switch 23 and the closing manipulation switch 24.

An operation position sensor 25 is connected to the door ECU 22. The door ECU 22 detects the operation position (opening/closing position) of the sliding door 1 based on a signal (operation position signal Sp) output from the operation position sensor 25. The door ECU 22 controls operation of the door opening/closing actuator 20 to open or close (or stop) the sliding door 1 in accordance with the detected direction of the manipulation input to the door handle 3 and the detected operation position of the sliding door 1.

In the present embodiment, the opening manipulation switch 23, the closing manipulation switch 24, and the door ECU 22 configure a manipulation input detector. Furthermore, the operation position sensor 25 and the door ECU 22 configure an operation position detector. The above-mentioned drive section (20), the controller (22), the handle unit (3), the manipulation input detector (22, 23, 24) and the operation position detector (22, 25) configure the opening/closing body control device for a vehicle, which is a door control device 30.

Door Opening/Closing Control

The manner and procedure of a door opening/closing control according to the present embodiment will now be described. The door ECU 22 periodically executes the computation process shown in the flowchart of FIG. 3.

Figure 3:
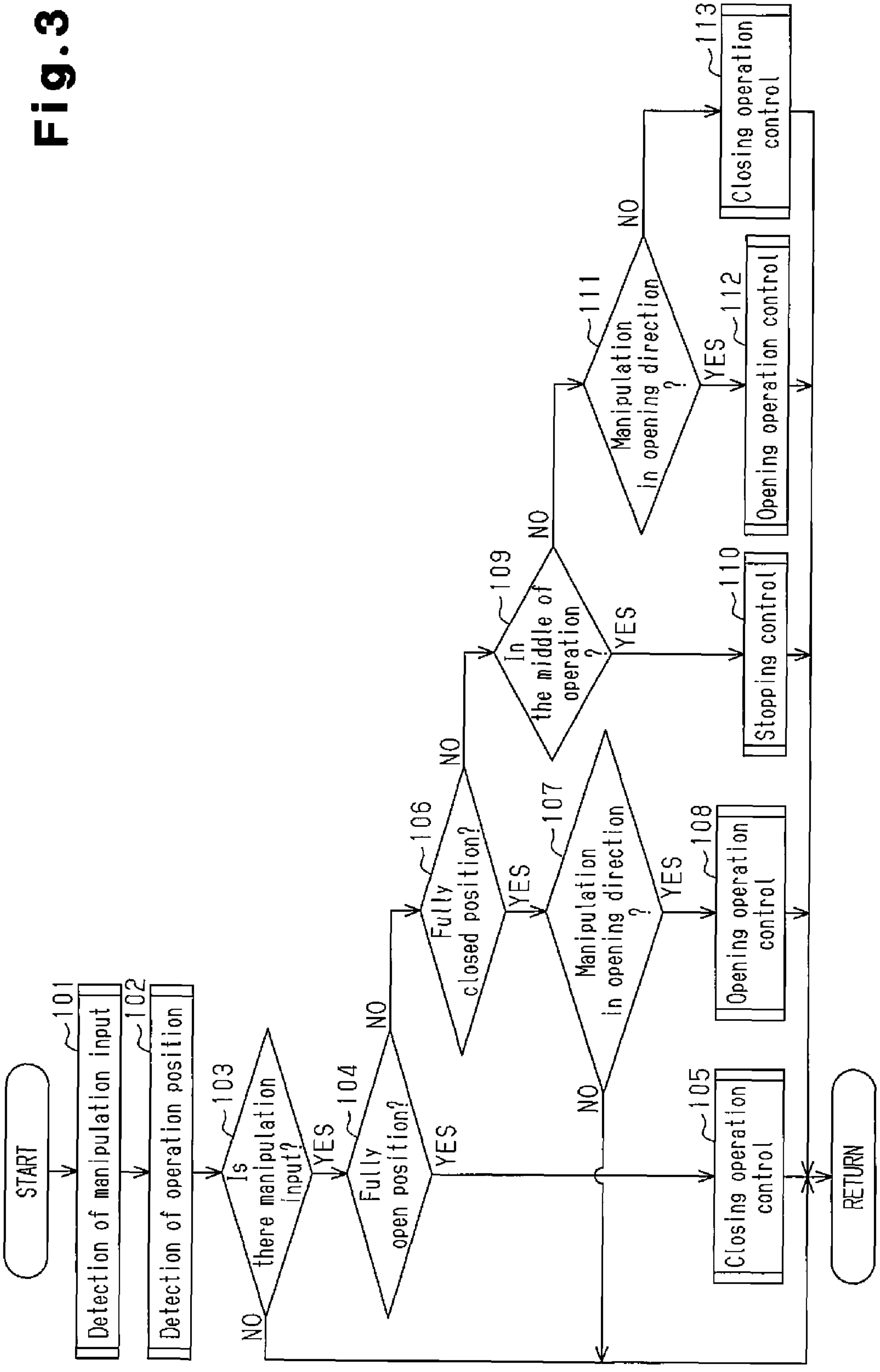
FIG. 3 is a flowchart showing the manner of a door opening/closing control according to a first embodiment.

As shown in the flowchart of FIG. 3, the door ECU 22 first executes a manipulation input detecting procedure (step 101) based on the manipulation input signal Sc and an operation position detecting procedure (step 102) based on the operation position signal Sp. The door ECU 22 then determines whether there is a manipulation input to the door handle 3 (step 103). If it is determined that there is a manipulation input, that is, if a manipulation input is detected (step 103: YES), the door ECU 22 subsequently determines whether the sliding door 1 is at the fully open position (step 104). If it is determined that the sliding door 1 is at the fully open position (step 104: YES), the door ECU 22 executes a closing operation control to close the sliding door 1 (step 105) by the door opening/closing actuator 20.

That is, if the sliding door 1 is at the fully open position, the closing operation control is executed in both a case where a manipulation input in the closing direction is detected and a case where a manipulation input in the opening direction is detected in the manipulation input detecting procedure of step 101. If it is determined, in step 103, that there is no manipulation input to the door handle 3 (a manipulation input is not detected) (step 103: NO), the door ECU 22 does not execute the processes of step 104 and the subsequent steps.

If it is determined, in step 104, that the sliding door 1 is not at the fully open position (step 104: NO), the door ECU 22 subsequently determines whether the sliding door 1 is at the fully closed position (step 106). If it is determined that the sliding door 1 is at the fully closed position (step 106: YES), the door ECU 22 further determines whether the direction of the manipulation input to the door handle 3 is the opening direction (step 107). If the direction of the manipulation input is the opening direction (step 107: YES), the door ECU 22 executes an opening operation control to allow the sliding door 1 to be opened by the door opening/closing actuator 20 (step 108).

In step 107, if the direction of the manipulation input to the door handle 3 is the closing direction (step 107: NO), the door ECU 22 does not execute the processes of step 108 and the subsequent steps.

Furthermore, if it is determined, in step 106, that the sliding door 1 is not at the fully closed position (step 106: NO), that is, if the sliding door 1 is located at a position moved from the fully closed position, the door ECU 22 subsequently determines whether the sliding door 1 is in the middle of operation (step 109). If it is determined that the sliding door 1 is in the middle of operation, that is, if it is determined that the closing operation control or the opening operation control is being executed (step 109: YES), the door ECU 22 executes a stopping control to stop the operation of the sliding door 1 (step 110).

Furthermore, if it is determined that the sliding door 1 is not in the middle of operation in step 109, that is, if it is determined that the sliding door 1 has already been stopped (step 109: NO), the door ECU 22 subsequently determines whether the direction of the manipulation input to the door handle 3 is the opening direction (step 111). If the direction of the manipulation input is the opening direction (step 111: YES), the door ECU 22 executes the opening operation control (step 112). If the direction is not the opening direction, that is, if the direction is the closing direction (step 111: NO), the door ECU 22 executes the closing operation control (step 113).

The door control device 30 of the present embodiment that performs the above processes improves operability and convenience of the sliding door 1, which includes the door handle 3, which is operable by manipulation inputs in two directions corresponding to the opening operation and closing operation of the sliding door 1.

Operation of the door control device according to the present embodiment will now be described.

As described above, when manipulation input to the door handle 3 is detected (step 103: YES), if the sliding door 1 is at the fully open position (step 104: YES), the door ECU 22 executes the closing operation control (step 105) regardless of the direction of the manipulation input. That is, the sliding door 1 located at the fully open position is closed not only when the door handle 3 is manipulated in the closing direction, but also when the door handle 3 is manipulated in the opening direction that is opposite to the direction in which the sliding door 1 should be operated.

In a case in which the sliding door 1 is at the fully closed position (step 106: YES), the door ECU 22 executes the opening operation control (step 108) only when the direction of the manipulation input to the door handle 3 is the opening direction (step 107: YES). That is, if there is a manipulation input in the closing direction opposite to the direction in which the sliding door 1 should be operated (step 107: NO), the opening operation control is not executed. As described above, the sliding door 1 at the fully closed position is closed only when the door handle 3 is manipulated in the opening direction that matches the direction in which the sliding door 1 should be operated.

Furthermore, when a manipulation input to the door handle 3 is detected (step 103: YES), if the sliding door 1 is in the middle of operation (step 109: YES), the door ECU 22 executes the stopping control (step 110) regardless of the direction of the manipulation input. That is, if the door handle 3 is manipulated while the sliding door 1 is moving between the fully closed position and the fully closed position (step 109: YES), the sliding door 1 is stopped.

When the sliding door 1 is in a stopped state (step 109: NO), the door ECU 22 executes the opening operation control (step 112) if the direction of the manipulation input to the door handle 3 is the opening direction (step 111: YES), and the door ECU 22 executes the closing operation control (step 113) if the direction of the manipulation input to the door handle 3 is the closing direction (step 111: NO). That is, the sliding door 1 that is stopped at a position other than the fully open position and the fully closed position is operated in the direction corresponding to the direction of the manipulation input to the door handle 3.

The present embodiment has the following advantages.

(1) When the sliding door 1 is at the fully open position, the door ECU 22 executes the closing operation control in both a case where the manipulation input in the closing direction to the door handle 3 is detected and a case where the manipulation input in the opening direction to the door handle 3 is detected in the manipulation input detecting procedure.

With the above configuration, the sliding door 1 located at the fully open position is closed by intuitively manipulating the door handle 3 in the direction that matches the direction in which the sliding door 1 should be operated. Furthermore, even if the user manipulates the door handle 3 in the opening direction, which is opposite to the direction in which the sliding door 1 should be operated, due to history effect such as a memory or a habit from manipulating a conventional door handle in order to release the restraint (fully open lock) of the sliding door 1 by the lock mechanism, the sliding door 1 is closed by the manipulation input in the opening direction to the door handle 3. It is therefore possible to save the trouble of having to manipulate the door handle 3 in the closing direction after releasing the fully open lock. As a result, the operability and convenience are improved.

(2) When the sliding door 1 is at the fully closed position, the door ECU 22 executes the opening operation control if a manipulation input in the opening direction to the door handle 3 is detected in the manipulation input detecting procedure. The door ECU 22 does not execute the opening operation control if a manipulation input in the closing direction is detected.

According to the above configuration, the sliding door 1 at the fully closed position is opened by intuitively manipulating the door handle 3 in the direction that matches the direction in which the sliding door 1 should be operated. If the direction of the manipulation input to the door handle 3 does not match the direction in which the sliding door 1 should be operated, the sliding door 1 is kept at the fully closed state to prevent the sliding door 1 from being opened by erroneous manipulation. As a result, a high level of safety is ensured in addition to the improvement in the operability and convenience.

(3) If a manipulation input to the door handle 3 is detected during execution of the opening operation control or the closing operation control, the door ECU 22 executes the stopping control on the sliding door 1. With this configuration, the sliding door 1 that is being operated is promptly stopped by the intention of the user. As a result, for example, a foreign object is prevented from being caught by the sliding door 1.

(4) When the sliding door 1 is in a stopped state at a position other than the fully open position and the fully closed position, the door ECU 22 operates the sliding door 1 in the direction corresponding to the direction of a manipulation input to the door handle 3. This allows the user to open or close the sliding door 1 in a stopped state by intuitively manipulating the door handle 3 in a direction that matches the direction in which the sliding door 1 should be operated. As a result, the operability and convenience are improved.

Second Embodiment

A second embodiment of the present invention will now be described with reference to the drawings. The second embodiment differs from the first embodiment in the control executed when the sliding door is in the middle of operation. Like or the same reference numerals are given to those components that are like or the same as the corresponding components of the first embodiment and detailed explanations are omitted.

Furthermore, in the procedure described below, the processes of step 201 to step 208 are the same as the processes of step 101 to step 108 shown in the flowchart of FIG. 3. For the processes of step 201 to step 208, the steps in FIG. 3 are to be referred to, and illustration and detailed explanation are omitted.

Figure 4:
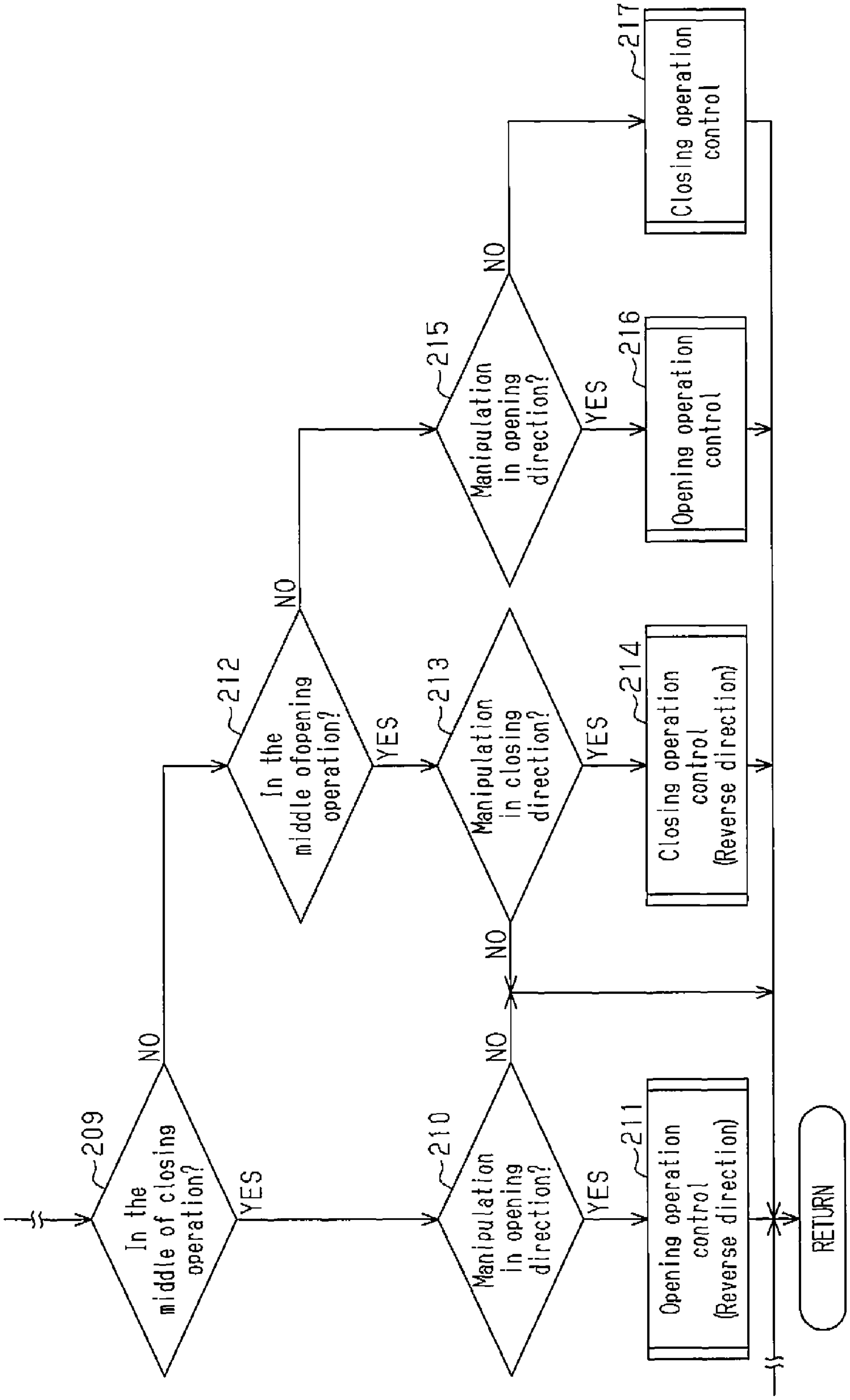
FIG. 4 is a flowchart showing the manner of a door opening/closing control according to a second embodiment.

As shown in the flowchart of FIG. 4, when a manipulation input to the door handle 3 is detected, if the sliding door 1 is neither at the fully open position nor the fully closed position (see FIG. 3, step 103: YES, step 104: NO, and step 106: NO), the door ECU 22 of the present embodiment determines whether the sliding door 1 is in the middle of the closing operation (closing operation control is being executed) (step 209). If it is determined, in step 209, that the sliding door 1 is in the middle of the closing operation (step 209: YES), the door ECU 22 determines whether the direction of the detected manipulation input is the opening direction (step 210). If the direction of the manipulation input is the opening direction, that is, opposite to the operation direction of the sliding door 1 (step 210: YES), the door ECU 22 executes the opening operation control (step 211) to reverse the operation direction of the sliding door 1.

In step 210, if the direction of the manipulation input is not the opening direction, that is, the closing direction that matches the operation direction of the sliding door 1 (step 210: NO), the door ECU 22 does not execute the process of step 211.

If it is determined, in step 209, that the sliding door 1 is not in the middle of the closing operation (step 209: NO), the door ECU 22 determines whether the sliding door 1 is in the middle of the opening operation (opening operation control is being executed) (step 212). If it is determined, in step 212, that the sliding door 1 is in the middle of the opening operation (step 212: YES), the door ECU 22 determines whether the direction of the detected manipulation input is the closing direction (step 213). If the direction of the manipulation input is the closing direction, that is, opposite to the operation direction of the sliding door 1 (step 213: YES), the door ECU 22 executes the closing operation control to reverse the operation direction of the sliding door 1 (step 214).

In step 213, if the direction of the manipulation input is not the closing direction, that is, if the direction of the manipulation input is the opening direction that matches the operation direction of the sliding door 1 (step 213: NO), the door ECU 22 does not execute the process of step 214.

If it is determined, in step 212, that the sliding door 1 is not in the middle of the opening operation, that is, if it is determined that the sliding door 1 is in a stopped state (step 212: NO), the door ECU 22 executes the opening operation control or the closing operation control corresponding to the direction of the manipulation input (step 215 to step 217) in order to operate the sliding door 1 in the direction corresponding to the detected manipulation input.

According to the present embodiment, when the sliding door 1 is in the middle of the operation in the opening direction or the closing direction, if the door handle 3 is manipulated in the opposite direction to the operation direction of the sliding door 1, the operation direction of the sliding door 1 is reversed to match the direction of the manipulation input to the door handle 3. In this manner, since the sliding door 1 can be more intuitively manipulated in the operation direction of the sliding door 1, the operability and convenience are further improved.

Third Embodiment

A third embodiment of the present invention will now be described with reference to the drawings. Like or the same reference numerals are given to those components that are like or the same as the corresponding components of the first embodiment and detailed explanations are omitted.

The door ECU 22 of the present embodiment has a function to control the door opening/closing actuator 20 (see FIG. 1) in a drive mode selected from drive modes with different operation speeds of the sliding door 1. More specifically, the door ECU 22 includes a basic drive mode, which is a normal mode, and a high-speed operation mode as the drive modes. The operation speed of the sliding door 1 in the high-speed operation mode is greater than that in the normal mode. The opening/closing control (opening operation control or closing operation control) of the sliding door 1 is started in the normal mode among the two drive modes.

The door ECU 22 of the present embodiment also measures a duration (t) of the manipulation input to the door handle 3 based on a signal (manipulation input signal Sc) output from the opening manipulation switch 23 and the closing manipulation switch 24 provided in the door handle 3. More specifically, the door ECU 22, which functions as a measuring section, measures, as the duration (t) of the manipulation input, the time period from the point in time when the user grips the handgrip 10 to manipulate the door handle 3 in either the vehicle front direction or the rear direction to the point in time when the user lets go of the handgrip 10. If the duration (t) of the manipulation input exceeds a predetermined time period (t0), the door ECU 22 switches the drive mode from the normal mode, which is selected at the starting of the opening/closing control, to the high-speed operation mode.

Figure 5:
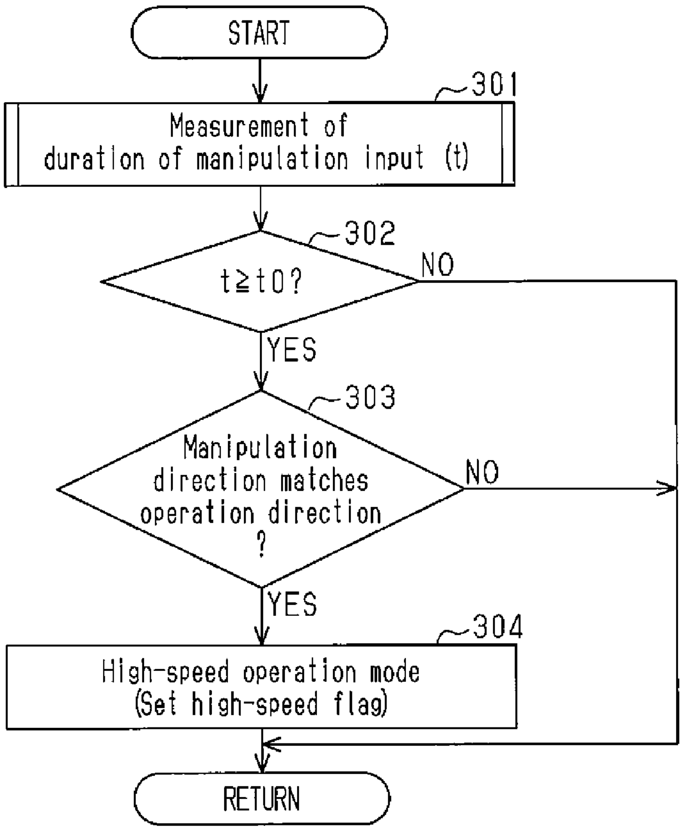
FIG. 5 is a flowchart showing the manner of a door opening/closing control according to a third embodiment.

As shown in the flowchart of FIG. 5, when the measuring process of the duration of the manipulation input is executed (step 301), the door ECU 22 determines whether the duration t exceeds the predetermined time period t0 (step 302). If the duration t of the manipulation input exceeds the predetermined time period t0 (t≥t0, step 302: YES), the door ECU 22 determines whether the direction of the manipulation input matches the operation direction of the sliding door 1 (step 303). When the direction of the manipulation input and the operation direction match (step 303: YES), the door ECU 22 sets a high-speed flag to switch the drive mode to the high-speed operation mode (step 304).

The door ECU 22 of the present embodiment executes the processes of step 301 to step 304 as a subroutine of the manipulation input detecting procedure (see FIG. 3, step 101). When the high-speed flag is set in step 304, the drive mode is switched from the normal mode to the high-speed operation mode in the closing operation control (see FIG. 3, such as step 105) or the opening operation control (see FIG. 3, such as step 108) that is under execution.

In step 302, if the duration t of the manipulation input is less than the predetermined time period t0 (t<t0, step 302: NO), the processes of step 303 and step 304 are not executed. Furthermore, in step 303, if the direction of the manipulation input and the operation direction do not match (step 303: NO), the process of step 304 is not executed. In these cases, since the closing operation control or the opening operation control is executed without setting the high-speed flag, the drive mode is maintained in the normal mode.

Operation of the door control device according to the present embodiment configured as described above will now be described.

Figure 6:
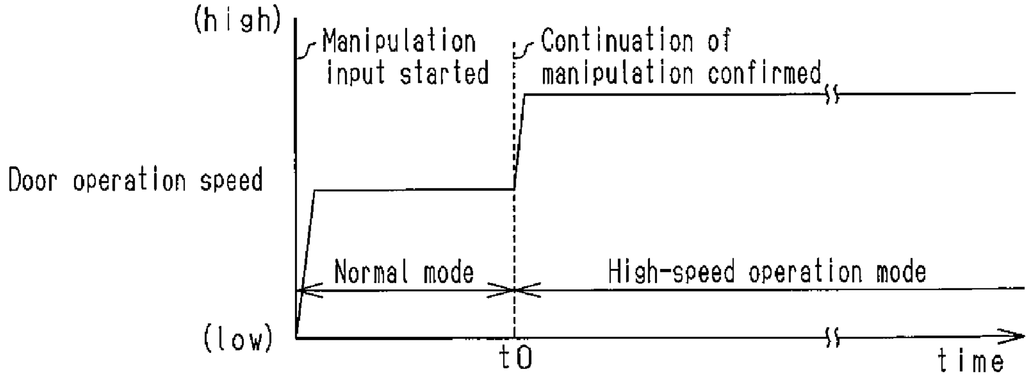
FIG. 6 is an explanatory diagram showing operation of the door opening/closing control according to the third embodiment.

As shown in FIG. 6, upon detection of the manipulation input to the door handle 3, the opening/closing control of the sliding door 1 is started (t=0) in the normal mode. In the present embodiment, if the manipulation input is continued thereafter, that is, if the user performs "prolonged manipulation," where the user keeps manipulating the door handle 3, the duration t of the prolonged manipulation is measured. If it is determined that the prolonged manipulation is continued over the predetermined time period t0, the drive mode is switched to the high-speed operation mode, and the operation speed of the sliding door 1 is increased.

Most of the users tend to easily accept that "there is correlation between the duration of the manipulation input and increase in the operation speed" in a sensory way from, for example, past experience. Measuring the duration of the manipulation input is advantageous because it is unlikely to be affected by the structure of the door handle 3 and deterioration with age. With the above configuration, the sliding door 1 is more reliably opened and closed at an appropriate speed that the user desires by intuitive manipulation. As a result, the operability and convenience are further improved.

Furthermore, if the manipulation direction of the door handle 3 does not match the operation direction of the sliding door 1, the operation speed of the sliding door 1 is kept low. This prevents the sliding door 1 from being operated at a high speed by erroneous manipulation, and as a result, a high level of safety is ensured in addition to the improvement in the operability and convenience.

Each of the illustrated embodiments may be modified as follows.

In each of the embodiments, the present invention is embodied in the door control device 30, which opens and closes the sliding door 1 provided on the side surface of the vehicle body. However, the present invention may be applied to a control device for other doors such as a swing door, or a back door or a luggage door provided at the vehicle rear portion. The present invention may also be applied to an opening/closing body control device for a vehicle intended for an opening/closing body other than doors such as a sunroof unit and a power window unit.

In each of the above embodiments, the present invention is applied to the door handle 3 provided on the outer panel 2, which is the outer surface of the sliding door 1, that is, an outside handle. However, the present invention may be applied to a handle unit provided in a passenger compartment, that is, an inside handle. Furthermore, the configuration of the handle unit may be changed as required as long as the handle unit is operable by manipulation inputs in two directions corresponding to the opening operation and closing operation of the opening/closing body.

In each of the above embodiments, restraint of the sliding door 1 by the lock mechanisms 5 is released by mechanically transmitting the manipulation force based on the manipulation input on the door handle 3 to the lock mechanisms (latch mechanisms) 5. However, an electrical signal generated based on the manipulation input to the door handle 3 may be transmitted to an actuator, and the actuator may release the restraint of the lock mechanisms 5. Furthermore, the configuration for releasing the restraint by mechanical transmission of the manipulation force like the above embodiments and the configuration for releasing the restraint by an electrical signal may be combined.

In each of the above embodiments, the process for detecting a manipulation input to the door handle 3 (see FIG. 3, step 101) is executed prior to the process for detecting the operation position of the sliding door 1 (step 102), but the execution order may be reversed.

In each of the above embodiments, if it is determined that the sliding door 1 is at the fully open position (step 104: YES), the closing operation control is executed (step 105) without performing a process for determining the operation direction of the door handle 3. However, the closing operation control of the sliding door 1 may be executed when a manipulation input in the closing direction is explicitly detected and when a manipulation input in the opening direction is explicitly detected.

In the second embodiment, although not particularly mentioned, as for the specific description of the control in the opening operation control (step 211) and the closing operation control (step 214) executed to reverse the operation direction of the sliding door 1, the details may differ from the opening operation control (step 108) and the closing operation control (step 105) performed from a stopped state, such as the transient property when reversing the operation direction.

Furthermore, also for the opening operation control (step 112, 216) and the closing operation control (step 113, 217) performed from a stopped state at a position other than the fully open position and the fully closed position, the details of the control may differ from the opening operation control (step 108) and the closing operation control (step 105) performed from the fully open position or the fully closed position.

The third embodiment is explained based on the configuration of the first embodiment, but the third embodiment may be based on the configuration of the second embodiment.

In the third embodiment, the door ECU 22 includes the normal mode and the high-speed operation mode as the drive modes. However, three or more drive modes may be provided. In this case, switching manner of the drive modes may be set in various ways. That is, any configuration may be employed for "switching the drive mode to the high-speed operation mode" as long as the drive mode is switched to another drive mode with the operation speed of the sliding door 1 greater than the current drive mode regardless of which drive mode is selected before the duration t of the manipulation input to the door handle 3 exceeds the predetermined time period t0.

The invention claimed is:

1. An opening/closing body control device for a vehicle, comprising:

a drive section that drives an opening/closing body of the vehicle;

a controller that controls the drive section;

a handle unit, which is operable by a manipulation input in an opening direction corresponding to an opening operation of the opening/closing body and operable by a manipulation input in a closing direction corresponding to a closing operation of the opening/closing body;

a manipulation input detector that detects a manipulation input to the handle unit and a direction of the manipulation input; and an operation position detector that detects the operation position of the opening/closing body, wherein the controller is configured such that, when the opening/closing body is at a fully open position, the controller executes a closing operation control to close the opening/closing body in both a case where a manipulation input in the closing direction is detected and a case where a manipulation input in the opening direction is detected, and when a manipulation input to the handle unit is detected while the opening/closing body is stopped at a position other than the fully open position and a fully closed position, the controller controls the drive section to operate the opening/closing body in a direction corresponding to the direction of the manipulation input.

2. The opening/closing body control device for a vehicle according to claim 1, wherein the controller is configured such that, when the opening/closing body is at a fully closed position, the controller executes an opening operation control to open the opening/closing body if a manipulation input in the opening direction is detected and does not execute the opening operation control if a manipulation input in the closing direction is detected.

3. The opening/closing body control device for a vehicle according to claim 1, wherein the controller is configured such that, when a manipulation input in the closing direction is detected while the opening/closing body is in the middle of an opening operation, the controller controls the drive section to reverse an operation direction of the opening/closing body to close the opening/closing body.

4. The opening/closing body control device for a vehicle according to claim 1, wherein the controller is configured such that, when a manipulation input in the opening direction is detected while the opening/closing body is in the middle of a closing operation, the controller controls the drive section to reverse an operation direction of the opening/closing body to open the opening/closing body.

5. The opening/closing body control device for a vehicle according to claim 1, wherein the controller is configured such that, when a manipulation input to the handle unit is detected during an opening operation or a closing operation of the opening/closing body, the controller executes a stopping control to stop the opening/closing body.

6. The opening/closing body control device for a vehicle according to claim 1, further comprising a measuring section for measuring duration of a manipulation input to the handle unit, wherein the controller is configured to be capable of controlling the drive section in a drive mode selected from a plurality of drive modes with different operation speeds of the opening/closing body, and the controller is configured such that, when the duration exceeds a predetermined time period, the controller switches the drive mode to a high-speed operation mode that has an operation speed greater than that in the drive mode selected before the duration exceeds the predetermined time period.

7. The opening/closing body control device for a vehicle according to claim 6, wherein the controller is configured to switch the drive mode to the high-speed operation mode only when the direction of a manipulation input to the handle unit matches an operation direction of the opening/closing body.

8. An opening/closing body control device for a vehicle, comprising:

a drive section that drives an opening/closing body of the vehicle;

a controller that controls the drive section;

a handle unit, which is operable by a manipulation input in an opening direction corresponding to an opening operation of the opening/closing body and operable by a manipulation input in a closing direction corresponding to a closing operation of the opening/closing body;

a manipulation input detector that detects a manipulation input to the handle unit and a direction of the manipulation input; and an operation position detector that detects the operation position of the opening/closing body, wherein the controller is configured such that, when the opening/closing body is at a fully open position, the controller executes a closing operation control to close the opening/closing body in both a case where a manipulation input in the closing direction is detected and a case where a manipulation input in the opening direction is detected, and when a manipulation input to the handle unit is detected during an opening operation or a closing operation of the opening/closing body, the controller executes a stopping control to stop the opening/closing body.

9. The opening/closing body control device for a vehicle according to claim 8, wherein the controller is configured such that, when the opening/closing body is at a fully closed position, the controller executes an opening operation control to open the opening/closing body if a manipulation input in the opening direction is detected and does not execute the opening operation control if a manipulation input in the closing direction is detected.

10. The opening/closing body control device for a vehicle according to claim 8, further comprising a measuring section for measuring duration of a manipulation input to the handle unit, wherein the controller is configured to be capable of controlling the drive section in a drive mode selected from a plurality of drive modes with different operation speeds of the opening/closing body, and the controller is configured such that, when the duration exceeds a predetermined time period, the controller switches the drive mode to a high-speed operation mode that has an operation speed greater than that in the drive mode selected before the duration exceeds the predetermined time period.

11. The opening/closing body control device for a vehicle according to claim 10, wherein the controller is configured to switch the drive mode to the high-speed operation mode only when the direction of a manipulation input to the handle unit matches an operation direction of the opening/closing body.

12. An opening/closing body control device for a vehicle, comprising:

a drive section that drives an opening/closing body of the vehicle;

a controller that controls the drive section;

a handle unit, which is operable by a manipulation input in an opening direction corresponding to an opening operation of the opening/closing body and operable by a manipulation input in a closing direction corresponding to a closing operation of the opening/closing body;

a manipulation input detector that detects a manipulation input to the handle unit and a direction of the manipulation input;

an operation position detector that detects the operation position of the opening/closing body; and a measuring section for measuring duration of a manipulation input to the handle unit, wherein the controller is configured such that, when the opening/closing body is at a fully open position, the controller executes a closing operation control to close the opening/closing body in both a case where a manipulation input in the closing direction is detected and a case where a manipulation input in the opening direction is detected, and wherein the controller is configured to be capable of controlling the drive section in a drive mode selected from a plurality of drive modes with different operation speeds of the opening/closing body, and the controller is configured such that, when the duration exceeds a predetermined time period, the controller switches the drive mode to a high-speed operation mode that has an operation speed greater than that in the drive mode selected before the duration exceeds the predetermined time period.

13. The opening/closing body control device for a vehicle according to claim 12, wherein the controller is configured such that, when the opening/closing body is at a fully closed position, the controller executes an opening operation control to open the opening/closing body if a manipulation input in the opening direction is detected and does not execute the opening operation control if a manipulation input in the closing direction is detected.

14. The opening/closing body control device for a vehicle according to claim 12, wherein the controller is configured such that, when a manipulation input in the closing direction is detected while the opening/closing body is in the middle of an opening operation, the controller controls the drive section to reverse an operation direction of the opening/closing body to close the opening/closing body.

15. The opening/closing body control device for a vehicle according to claim 12, wherein the controller is configured such that, when a manipulation input in the opening direction is detected while the opening/closing body is in the middle of a closing operation, the controller controls the drive section to reverse an operation direction of the opening/closing body to open the opening/closing body.

16. The opening/closing body control device for a vehicle according to claim 12, wherein the controller is configured to switch the drive mode to the high-speed operation mode only when the direction of a manipulation input to the handle unit matches an operation direction of the opening/closing body.

* * * * *